(12) United States Patent
Murade

(10) Patent No.: US 7,750,876 B2
(45) Date of Patent: Jul. 6, 2010

(54) ELECTRO-OPTICAL DEVICE AND ELECTRONIC APPARATUS WITH IMAGE SIGNAL CONVERSION

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1139 days.

(21) Appl. No.: 11/142,528

(22) Filed: Jun. 2, 2005

(65) Prior Publication Data
US 2006/0001927 A1 Jan. 5, 2006

(30) Foreign Application Priority Data
Jun. 18, 2004 (JP) ............................. 2004-181052
Apr. 18, 2005 (JP) ............................. 2005-119324

(51) Int. Cl.
G09G 3/36 (2006.01)
H03M 9/00 (2006.01)
G02F 1/1333 (2006.01)

(52) U.S. Cl. ............................. 345/87; 345/100; 349/56
(58) Field of Classification Search .................. 345/87, 345/98–100, 89, 103; 349/56, 84; 341/100
See application file for complete search history.

(56) References Cited

U.S. PATENT DOCUMENTS

| 6,212,091 | B1 | 4/2001 | Kawabata et al. |
| 6,262,702 | B1 | 7/2001 | Murade |
| 6,483,493 | B2 | 11/2002 | Murade |
| 6,531,996 | B1 * | 3/2003 | Murade ...................... 345/98 |
| 6,741,322 | B2 | 5/2004 | Byun et al. |

(Continued)

FOREIGN PATENT DOCUMENTS

JP A 06-011684 1/1994

(Continued)

OTHER PUBLICATIONS

JP-08-022026-A Machine Translation.*

*Primary Examiner*—Amr Awad
*Assistant Examiner*—Liliana Cerullo
(74) *Attorney, Agent, or Firm*—Oliff & Berridge, PLC

(57) ABSTRACT

An electro-optical device includes a display unit that has a plurality of switching elements provided at intersections of a plurality of scanning lines and a plurality of data lines and that drives the plurality of switching elements based on image signals supplied to the plurality of data lines so as to display images, a driving unit that controls driving of the display unit through a phase expansion so as to drive the plurality of switching elements for predetermined blocks, m×n signal wiring lines that transmit image signals, the image signals being divided into m (where m is a natural number of 2 or more) parallel data sequences and each of the data sequences including n (where n is a natural number of m or less) image signals, and that have extended portions such that the m×n signal wiring lines are grouped into a plurality of groups of signal wiring lines, each of the groups including n signal wiring lines for each data sequence on a substrate, and such that the plurality of groups of signal wiring lines for each data sequence are grouped, and a shield line that is formed between two adjacent groups of signal wiring lines for each data sequence along the signal wiring lines in a portion where the signal wiring lines extend.

20 Claims, 10 Drawing Sheets

U.S. PATENT DOCUMENTS 6,760,254 B2 7/2004 Taura
7,298,356 B2 * 11/2007 Murade ........................ 345/92

FOREIGN PATENT DOCUMENTS

| JP | A 08-022026 | 1/1996 |
| JP | A 11-202367 | 7/1999 |
| JP | A 2001-183696 | 7/2001 |
| JP | A 2001-215928 | 8/2001 |
| JP | A 2002-049052 | 2/2002 |
| JP | A 2002-049330 | 2/2002 |
| JP | A 2002-221929 | 8/2002 |
| JP | A 2004-46201 | 2/2004 |
| KR | 10-2004-0095829 A | 11/2004 |
| TW | 0462055 B | 11/2001 |
| TW | 0569242 B | 1/2004 |

* cited by examiner

ELECTRO-OPTICAL DEVICE AND ELECTRONIC APPARATUS WITH IMAGE SIGNAL CONVERSION

This application claims the benefit of Japanese Patent Application No. 2004-181052, filed Jun. 18, 2004 and Japanese Patent Application No. 2005-119324, filed Apr. 18, 2005. The entire disclosure of the prior applications are hereby incorporated by reference herein in their entirety.

BACKGROUND OF THE INVENTION

1. Technical Field

The present invention relates to an electro-optical device that is suited to display images with high definition and to an electronic apparatus.

2. Related Art

In general, electro-optical devices, for example, liquid crystal devices for displaying images, which use liquid crystal as an electro-optical material, include a pair of substrates and liquid crystal interposed between the pair of substrates. Of these devices, an electro-optical device such as an active-matrix-type liquid crystal device which is driven by thin film transistors (TFTs), thin film diodes (TFDs) or the like includes a plurality of scanning lines and data lines which are arranged in vertical and horizontal directions, a plurality of pixel electrodes disposed at intersections of the plurality of scanning lines and the plurality of data lines, and the like. All of them are arranged on a TFT array substrate.

The scanning lines are sequentially supplied with scanning signals from a scanning line driving circuit. On the other hand, the data lines are supplied with image signals from a sampling circuit which is driven by a data line driving circuit. That is, the data line driving circuit supplies a sampling circuit driving signal to the sampling circuit which samples the image signals on image signal lines for each data line, simultaneously with the sequential supply operation of the scanning signals.

In general, the data line driving circuit includes a plurality of latch circuits (shift register circuits) that sequentially shift transmission signals, which are supplied at the beginning of a horizontal scanning period, according to a clock signal and that output the shifted signals as the sampling signals. Likewise, the scanning line driving circuit includes a plurality of latch circuits that sequentially shift transmission signals, which are supplied at the beginning of a vertical scanning period, according to the clock signal and that output the shifted signals as the scanning signals. In addition, the sampling circuit includes sampling switches which are provided for the respective data lines so as to sample the image signals, which are supplied from the outside, according to the sampling signals output from the data line driving circuit.

In the meantime, recently, in compliance with the general demand for quality improvement of display images, the pixel pitch has been reduced more and more, which causes the driving frequency to increase.

However, when the driving frequency is increased in such a simple method where the transmission signals sequentially output from the shifter circuit are used as the sampling signals, a sampling time assigned for the sampling circuit becomes short. This may result in deterioration of the sampling capability in the sampling circuit. In this regard, in order to enhance transistor characteristics of the TFTs constituting the sampling circuit or wiring line characteristics of various wiring lines, such as resistance, time constant, and the like, the production cost may be increased or the yield reduced.

Recently, as a countermeasure against a high-frequency dot clock, a group of image signals is subjected to serial-parallel conversion to form a plurality of m groups. More specifically, a technique in which the simultaneous sampling operation of the m groups of image signals is performed according to the sampling signals, together with 'phase expansion', and the sampled image signals are supplied to m data lines has been developed. That is, a technique in which driving control based on 'phase expansion' is performed using image signals divided into m (where m is a natural number of 2 or more) parallel data sequences for the phase expansion has been developed. The number of data sequences into which the image signals are divided by the phase expansion is, for example, 6, 12, 24, or the like. In addition, in the case of color image signals, if the image signals of the m data sequences subjected to the phase expansion have n colors (where n is a natural number of m or less, for example, 3 in the case of three RGB colors), respectively, each of the image signals becomes n parallel color signals. In this case, the image signals of one data sequence mean a set of n (for example, 3) image signals.

In general, for example, when one pixel has three RGB subpixels for a color image display, the conversion operation of a color image signal into three RGB parallel image signals is sometimes called 'phase expansion' or 'serial-parallel conversion' in a broad sense. In this case, the three RGB image signals as image signals of subpixels belonging to the same pixel are defined as image signals of 'different data sequences', and one image signal is constantly converted into three image signals through the phase expansion or the serial-parallel conversion.

However, in this specification, in the case of the color image signals, the three RGB image signals serving as image signals of subpixels belonging to the same pixel are defined as image signals of the 'same data sequence'. More broadly, in this specification, parallel image signals belonging to the same pixel or the same group of pixels are defined as image signals of the 'same data sequence' or 'one data sequence'. That is, in this specification, 'phase expansion' or 'serial-parallel conversion' means the conversion operation of an image signal into parallel image signals belonging to different pixels. For example, in the case of the color image signals, the image signals of one data sequence after the phase expansion have a set of three RGB color image signals as image signals of subpixels belonging to the same pixel.

Moreover, the above-described phase expansion is disclosed in Japanese Unexamined Patent Application Publication No. 2004-46201 and other publications.

However, recently, with an increasing need for images with high definition and reduction of the pixel pitch, it is required to arrange a plurality of scanning lines and data lines at narrow pitches on a display panel and to drive these lines at a high frequency.

In addition, it is required to increase the number of image signal lines on the display panel by the number of phase expansions. In particular, in order to display color images in which one pixel has, for example, three RGB subpixels, three image signal lines per one pixel are required. Accordingly, it is required to form image signal lines whose number is given by the number of phase expansions×3.

In such a manner, the number of image signal lines for the phase expansion formed on a substrate increases. In particular, in the case of a plurality of image signals for the same pixel, such as image signals of subpixels, the number of image signal lines for the phase expansion formed on a substrate increases more and more. In addition, wiring lines of sampling circuit driving signal lines or the like which need to cross above or below the image signal lines become complex.

Therefore, there is a problem in that noise due to the effect of adjacent signal lines is not negligible.

SUMMARY

An advantage of the invention is that it provides an electro-optical device that can control driving through a phase expansion to display images with high resolution and suppress the effect of noise on image signals, and an electronic apparatus.

According to a first aspect of the invention, an electro-optical device includes a display unit that has a plurality of switching elements provided at intersections of a plurality of scanning lines and a plurality of data lines and that drives the plurality of switching elements based on image signals supplied to the plurality of data lines so as to display images, a driving unit that controls driving of the display unit through a phase expansion so as to drive the plurality of switching elements for predetermined blocks, m×n signal wiring lines that transmit image signals, the image signals being divided into m (where m is a natural number of 2 or more) parallel data sequences and each of the data sequences including n (where n is a natural number of m or less) parallel image signals, and that have extended portions such that the m×n signal wiring lines are grouped into a plurality of groups of signal wiring lines, each of the groups including n signal wiring lines for each data sequence on a substrate, and such that the plurality of groups of signal wiring lines for each data sequence are grouped, and a shield line that is formed between two adjacent groups of signal wiring lines for each data sequence along the signal wiring line in a portion where the signal wiring lines extend.

In the operation of the electro-optical device according to the first aspect of the invention, the image signals are divided into the m parallel data sequences for a phase expansion, each data sequence including n parallel image signals, for example, through external circuit connection terminals from an external circuit and thus m×n image signals in total are supplied. For example, since n=3 when one pixel has three RGB subpixels for a color image display, if the number m of phase expansions is 4, 8, 16, . . . , the number of parallel color image signals, such as 4×3, 8×3, 16×3, . . . , are respectively supplied. Then, these parallel m×n image signals constitute the electro-optical device. For example, these image signals are transmitted by m×n signal wiring lines disposed on a substrate such as a TFT array substrate, an element substrate or the like.

In this manner, when the m×n image signals are supplied, for example, a driving control through the phase expansion for driving a plurality of switching elements for predetermined blocks by the driving unit such as the data line driving circuit, in correspondence to each data sequence, is performed on the display unit. Then, based on the image signals supplied to the data lines through the signal wiring lines, the switching elements are driven to display the images according to an active matrix driving method, for example.

Here, particularly, the m×n signal wiring lines are grouped into a plurality of groups of signal wiring lines, each of the groups including n signal wiring lines for each data sequence on a substrate and includes the extended portions such that the plurality of groups of signal wiring lines for each data sequence are grouped. The extended portion may extend in linear or strip shapes or may be bent and extend at one or more positions. In any case, typically, the signal wiring lines grouped on the substrate extend in parallel to one another with a preset wiring pitch as viewed from the substrate in plan view. In addition, 'a direction in which the signal wiring lines extend' according to the invention is a direction in parallel to a side line where the external circuit connection terminals are provided on the element substrate, for example.

The shield line is formed between two adjacent groups of signal wiring lines for each data sequence along the signal wiring lines in a portion where the signal wiring line extend. Specifically, as viewed from the substrate in plan view, the shield line is disposed along a boundary between two adjacent groups of signal wiring lines for each data sequence. In addition, preferably, the shield line for shielding the signal wiring lines is not mostly or entirely provided in portions other than the boundary between these groups of signal wiring lines.

Accordingly, in an operation such as the above-described active matrix driving operation, an electromagnetic shield by the shield line does not occur among n image signals belonging to the same data sequence. On the contrary, the electromagnetic shield by the shield line occurs among image signals belonging to different data sequences. By the way, n image signals belonging to the same data sequence have basically similar signal contents. For example, in the case of image signals of subpixels regarding the same pixel, one or some components of the signals, such as color components, may merely be different. Accordingly, there is essentially little adverse effect of electromagnetic noise on the n image signals belonging to the same data sequence. In addition, for example, an adverse effect or mutual interference by the electromagnetic noise in adjacent display portions in an image display region of subpixels constituting one pixel is not mostly appeared on the sense of sight. Accordingly, while a small mutual interference between image signals in the same pixel is allowed, a large mutual interference between image signals in different pixels can be efficiently eliminated by the shield line.

If the shield line is disposed among all signal wiring lines, the large effect of the electromagnetic shield can be expected. However, this leads to increase of the number or occupied area of shield lines and signal wiring lines on the substrate, which results in a large and complex configuration of the substrate or device. However, according to the first aspect of the invention, since the shield line is generally disposed at only boundaries among the groups of signal wiring lines, such a situation can be avoided.

As described above, according to the first aspect of the invention, while the driving control by the phase expansion is performed, the shield line is disposed along the signal wiring lines for each signal wiring line that transmits one data sequence of the phase expansion and also is disposed among the signal wiring lines that transmit the image signals of different data sequences, the effect of noise due to the image signals of the different data sequences can be effectively avoided with the relatively less number of shield lines, thereby allowing miniaturization of the device and high quality images.

In the electro-optical device according to the first aspect of the invention, preferably, the signal wiring lines transmit image signals of n subpixels constituting one pixel and corresponding to n colors as n parallel image signals in each data sequence.

With this configuration, each pixel is driven based on the image signals of n subpixels, for example, three RGB subpixels. Since the shield line is disposed for each group of signal lines that transmit the image signals of the subpixels belonging to the same pixel, each pixel can be prevented from deteriorating due to the effect of noise of different pixels.

In the electro-optical device according to the first aspect of the invention, preferably, the shield line is arranged adjacent to signal wiring lines that transmit image signals of subpixels corresponding to colors, excluding green, of the n colors.

With this configuration, the signal wiring lines regarding green in which an adverse effect due to the electromagnetic noise is liable to be relatively appeared on the sense of sight are disposed apart from the shield line. That is, the signal wiring lines regarding green which is essentially susceptible to the adverse effect due to the electromagnetic noise are disposed relatively far apart from groups of signal wiring lines of different data sequences, with different signal wiring lines in addition to the shield line disposed therebetween, as viewed from the substrate in plan view. In addition, the signal wiring lines regarding red and blue other than green in which the adverse effect due to the electromagnetic noise is difficult to be relatively appeared on the sense of sight are disposed adjacent to the shield line. That is, although the signal wiring lines regarding red and blue are adjacent to the different groups of signal wiring lines, with only the shield line disposed therebetween, the signal wiring lines regarding red and blue are electromagnetically shielded by the shield line. As a result, there occurs little adverse effect by the electromagnetic noise.

In this manner, since the shield line is disposed among the signal wiring lines that transmit two green image signals of the different data sequences, the adverse effect due to the green image signals which are likely to be a source of noise can be avoided, thereby achieving high quality images.

In the electro-optical device according to the first aspect of the invention, preferably, signal wiring lines that transmit image signals of subpixels corresponding to green of the n colors are disposed at a center in each of the groups of signal wiring lines for each data sequence, signal wiring lines that transmit image signals of subpixels corresponding to red of the n colors are disposed at one end in each of the groups of signal wiring lines for each data sequence, and signal wiring lines that transmit image signals of subpixels corresponding to blue of the n colors are disposed at the other end in each of the groups of signal wiring lines for each data sequence.

With this configuration, since the signal wiring lines regarding green in which the adverse effect of the electromagnetic noise is liable to be relatively appeared are disposed at the center of each group of signal wiring lines, the signal wiring lines regarding blue or red are provided, in addition to the shield line, between the signal wiring lines regarding green and the group of signal wiring lines of different data sequences. Accordingly, the adverse effect of the electromagnetic noise can be effectively reduced through a relatively simple configuration.

In the electro-optical device according to the first aspect of the invention, preferably, the signal wiring lines are formed such that the signal wiring lines that transmit the image signals of the subpixels corresponding to the same color of the n colors to two adjacent groups of signal wiring lines for each data sequence with the shield line interposed therebetween are adjacent to each other with the shield line interposed therebetween.

With this configuration, at a boundary between one group of signal wiring lines and an adjacent group of signal wiring lines, for example, signal wiring lines regarding the blue face one another or signal wiring lines regarding red face one another, with the shield line disposed therebetween. Here, particularly, in the case of image signals having the same color in groups of signal wiring lines of different data sequences, the adverse effect of the electromagnetic noise is difficult to be relatively appeared on the sense of sight. Conversely speaking, in the case of different color image signals in the groups of signal wiring lines of different data sequences, the adverse effect of the electromagnetic noise is liable to be relatively appeared on the sense of sight. Accordingly, the configuration in which the signal wiring lines regarding the same color face one another with the shield disposed therebetween has a great advantage in reducing the adverse effect of the electromagnetic noise efficiently.

According to a second aspect of the invention, an electro-optical device includes a display unit that has a plurality of switching elements provided at intersections of a plurality of scanning lines and a plurality of data lines and that drives the plurality of switching elements based on image signals supplied to the plurality of data lines so as to display images, a driving unit that controls driving of the display unit through a phase expansion so as to drive the plurality of switching elements for predetermined blocks, m×n signal wiring lines that transmit image signals, the image signals being divided into m (where m is a natural number of 2 or more) parallel data sequences and each of the data sequences including n (where n is a natural number of m or less) parallel image signals, and that have extended portions such that the m×n signal wiring lines are grouped into a plurality of groups of signal wiring lines, each of the groups including n signal wiring lines for each data sequence on a substrate, and such that the plurality of groups of signal wiring lines for each data sequence are grouped, a plurality of branch wiring lines that are branched in directions to cross the signal wiring lines corresponding to the plurality of data lines from the signal wiring lines to reach the driving unit and that have extended portions such that the plurality of branch wiring lines are grouped into a plurality of groups of branch wiring lines for each data sequence corresponding to the groups of signal wiring lines for each data sequence on the substrate and such that the plurality of groups of branch wiring lines are grouped, and a first shield line that is formed between two adjacent groups of branch wiring lines for each data sequence along the branch wiring lines in a portion where the branch wiring lines extend.

Like the electro-optical device according to the first aspect of the invention, the electro-optical device according to the second aspect of the invention displays images according to the active matrix driving method, for example.

Here, particularly, a plurality of branch wiring lines are branched in a direction to cross the signal wiring lines from the m×n signal wiring lines, in correspondence to each of the plurality of data lines, to reach the driving unit, and the plurality of branch wiring lines include extended portions that extend to the driving unit, such that the plurality of groups of branch wiring lines are grouped. The extended portion may extend in linear or strip shapes, or may be bent and extend at one or more positions. In any case, typically, the branch wiring lines grouped on the substrate extend in parallel to one another with a preset wiring line pitch as viewed from the substrate in plan view. In addition, 'a direction in which the branch wiring lines extend' according to the invention is a direction orthogonal to a side line where the external circuit connection terminals are provided on the element substrate, for example.

The first shield line is formed between two adjacent groups of branch wiring lines for each data sequence along the branch wiring lines in a portion where the branch wiring lines extend. Specifically, as viewed from the substrate in plan view, the first shield line is disposed along a boundary between two adjacent groups of branch wiring lines for each data sequence. In addition, preferably, the first shield line for shielding the branch wiring lines is not mostly or entirely provided in portions other than the boundary between these groups of branch wiring lines.

Accordingly, in the operation such as the above-described active matrix driving operation, the electromagnetic shield by the first shield line does not occur among n image signals belonging to the same data sequence. On the contrary, the electromagnetic shield by the first shield line occurs among image signals belonging to different data sequences. By the way, n image signals belonging to the same data sequence have basically similar signal contents. For example, in the case of image signals of subpixels regarding the same pixel, one or some components of the signals, such as color components, may merely be different. Accordingly, there is essentially little adverse effect of electromagnetic noise on the n image signals belonging to the same data sequence. In addition, for example, the adverse effect or mutual interference by the electromagnetic noise in adjacent display portions in an image display region of subpixels constituting one pixel is not mostly appeared on the sense of sight. Accordingly, while a small mutual interference between image signals in the same pixel is allowed, a large mutual interference between image signals in different pixels can be efficiently eliminated by the first shield line.

If the first shield line is disposed among all branch wiring lines, the large effect of the electromagnetic shield can be expected. However, this leads to increase of the number or occupied area of shield lines and branch wiring lines on the substrate, which results in a large and complex configuration of the substrate or device. However, according to the second aspect of the invention, since the first shield line is generally disposed at only boundaries among the groups of branch wiring lines, such a situation can be avoided.

As described above, according to the second aspect of the invention, while the driving control by the phase expansion is performed, the first shield line is disposed along the branch wiring lines for each branch wiring line that transmits one data sequence of the phase expansion and also is disposed among the branch wiring lines that transmit the image signals of different data sequences, the effect of noise due to the image signals of the different data sequences can be effectively avoided with the relatively less number of shield lines, thereby allowing miniaturization of the device and high quality images.

In the electro-optical device according to the second aspect of the invention, preferably, the extended portions are provided at a boundary between an image display region on which the display unit is disposed and a peripheral region located in the periphery of the image display region, and passes through a sealing region that seals the electro-optical material of the display unit.

With this configuration, in the electro-optical device, liquid crystal, which is an example of an electro-optical material, is sealed between a pair of substrates. For example, the branch wiring lines include portions through which the branch wiring lines pass the sealing region. Accordingly, the branch wiring lines become long along the width of the sealing region and a measure against the electromagnetic noise become increasingly important. According to the second aspect of invention, since the branch wiring lines are formed along the portion passing through the first shield line in the related sealing region, the miniaturization of the device and the high quality images can be simultaneously and more efficiently achieved with the relatively less number of shield lines.

Preferably, the electro-optical device according to the second aspect of the invention further includes a second shield line that is formed between two adjacent groups of signal wiring lines for each data sequence along the signal wiring lines in a portion where the signal wiring lines extend. A main line portion may have the extended portions of the signal wiring lines and the second shield lines, respectively. The branch wiring lines may have relay signal wiring lines that are branched in a direction to cross the main line portion from the signal wiring lines in the main line portion and lead signal wiring lines that connect the relay signal wiring lines to the data lines, respectively. The first shield line may be connected to a shield lead wiring line that is branched from the second shield line in the main line portion.

With this configuration, the second shield line, which is equal to the shield line in the electro-optical device according to the first aspect of the invention, is disposed in the main line portion including signal main lines. In addition, for the branch wiring lines branched from the main line portion, the shield line in the electro-optical device according to the second aspect of the invention is provided. Accordingly, the electromagnetic shield from the main line portion through the branch wiring lines can be almost perfectly achieved.

In the electro-optical device according to the second aspect of the invention, preferably, a plurality of second shield lines are arranged, and the shield lead wiring line is branched from one of the plurality of second shield lines that is disposed at the outermost side of the main line portion.

With this configuration, by the shield lead wiring lines branched from the outermost side of the main line portion or from the second shield line closest to the outermost side of the main line portion, the adverse effect of the electromagnetic noise on the image signals transmitted through the lead signal wiring lines can be reduced.

In the electro-optical device according to the second aspect of the invention, preferably, a plurality of second shield lines are arranged, and the shield lead wiring line is branched from each of the plurality of second shield lines so as to correspond to the portions where the branch wiring lines extend.

With this configuration, by the shield lead wiring lines branched from the plurality of second shield lines in correspondence to the extended portions, the adverse effect of the electromagnetic noise on the image signals transmitted through the lead signal wiring lines can be reduced.

In the electro-optical device according to the second aspect of the invention, preferably, the signal wiring lines, the first shield line, the lead signal wiring lines, and the shield lead wiring line are formed on a first layer, and the relay signal wiring line is formed on a second layer different from the first layer.

With this configuration, it is possible to form the relay signal wiring lines across the main line portion.

Preferably, the electro-optical device according to the second aspect of the invention further includes a shield relay wiring line that is connected to the first shield line across the main line portion and that is wired between the relay signal wiring lines.

With this configuration, the effect of noise among the relay signal wiring lines can be avoided, thereby achieving high quality images.

In the electro-optical device according to the second aspect of the invention, preferably, the signal wiring lines, the first shield line, the lead signal wiring lines, and the shield lead wiring line are formed on a first layer, and the relay signal wiring lines and the shield relay wiring line are formed on a second layer different from the first layer.

With this configuration, it is possible to form the relay signal wiring lines and the shield relay wiring lines across the main line portion.

In the electro-optical device according to the second aspect of the invention, preferably, the signal wiring lines transmit image signals of n subpixels constituting one pixel and corresponding to n colors as n parallel image signals in each data sequence. Further, the first shield line is arranged adjacent to branch wiring lines that transmit image signals of subpixels corresponding to colors, excluding green, of the n colors.

With this configuration, each pixel is driven based on the image signals of n subpixels, for example, three RGB subpixels. Since the first shield line is disposed for each group of branch lines that transmit the image signals of the subpixels belonging to the same pixel, each pixel can be prevented from deteriorating due to the an effect of noise of different pixels. In such a manner, since the shield line is disposed among the signal wiring lines that transmit two green image signals of the different data sequences, the adverse effect due to green image signals which are likely to be a source of noise can be avoided, thereby achieving high quality images.

In the electro-optical device according to the second aspect of the invention, preferably, the signal wiring lines transmit image signals of n subpixels constituting one pixel and corresponding to n colors as n parallel image signals in each data sequence. Further, branch wiring lines that transmit image signals of subpixels corresponding to green of the n colors may be disposed at a center in each of the groups of branch wiring lines for each data sequence. Further, branch wiring lines that transmit image signals of subpixels corresponding to red of the n colors may be disposed at one end in each of the groups of branch wiring lines for each data sequence. Further, branch wiring lines that transmit image signals of subpixels corresponding to blue of the n colors may be disposed at the other end in each of the groups of branch wiring lines for each data sequence.

With this configuration, since the branch wiring lines regarding green in which the adverse effect of the electromagnetic noise is liable to be relatively appeared are disposed at the center of each group of branch wiring lines, the branch wiring lines regarding blue or red are provided, in addition to the shield line, between the branch wiring lines regarding green and the group of branch wiring lines of different data sequences. Accordingly, the adverse effect of the electromagnetic noise can be effectively reduced via a relatively simple configuration.

In the electro-optical device according to the second aspect of the invention, preferably, the signal wiring lines transmit image signals of n subpixels constituting one pixel and corresponding to n colors as n parallel image signals in each data sequence. Further, the plurality of branch wiring lines are formed such that the branch wiring lines that transmit the image signals of the subpixels corresponding to the same color of the n colors to the two adjacent groups of branch wiring lines for each data sequence with the first shield line interposed therebetween are adjacent to each other with the first shield line interposed therebetween.

With this configuration, at a boundary between one group of branch wiring lines and an adjacent group of branch wiring lines, for example, branch wiring lines regarding blue face one another or branch wiring lines regarding red face one another, with the shield line disposed therebetween. Here, particularly, in the case of image signals having the same color in groups of branch wiring lines of different data sequences, the adverse effect of the electromagnetic noise is difficult to be relatively appeared on the sense of sight. Conversely speaking, in the case of different color image signals in the groups of branch wiring lines of different data sequences, the adverse effect of the electromagnetic noise is liable to be relatively appeared on the sense of sight. Accordingly, the configuration in which the branch wiring lines regarding the same color face one another with the shield disposed therebetween has a great advantage in reducing the adverse effect of the electromagnetic noise efficiently.

According to a third aspect of the invention, there is provided an electronic apparatus comprising the above-described electro-optical device (including various configurations) as a display unit.

Since the electronic apparatus according to the third aspect of the invention includes the above-described electro-optical device according to the first or second aspect of the invention, various electronic apparatuses, which can perform a high quality image, such as single-plate projection-type display devices, televisions, cellular phones, electronic organizers, word processors, view-finder-type or monitor-direct-view-type video tape recorders, workstations, video phones, POS terminals, touch panels, or the like, can be implemented. In addition, as the electronic apparatuses of the third aspect of the invention, electrophoretic devices, such as electronic papers, electron emission devices (Field Emission Displays and Conduction Electron-Emitter Displays), DLPs (Digital Light Processing) using the electrophoretic devices, the electron emission devices, or the like can be implemented.

The effects and advantages of the invention will be apparent from the embodiments described below.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, embodiments of the invention will be described in detail with reference to the accompanying drawings.

First Embodiment

Figure 1:
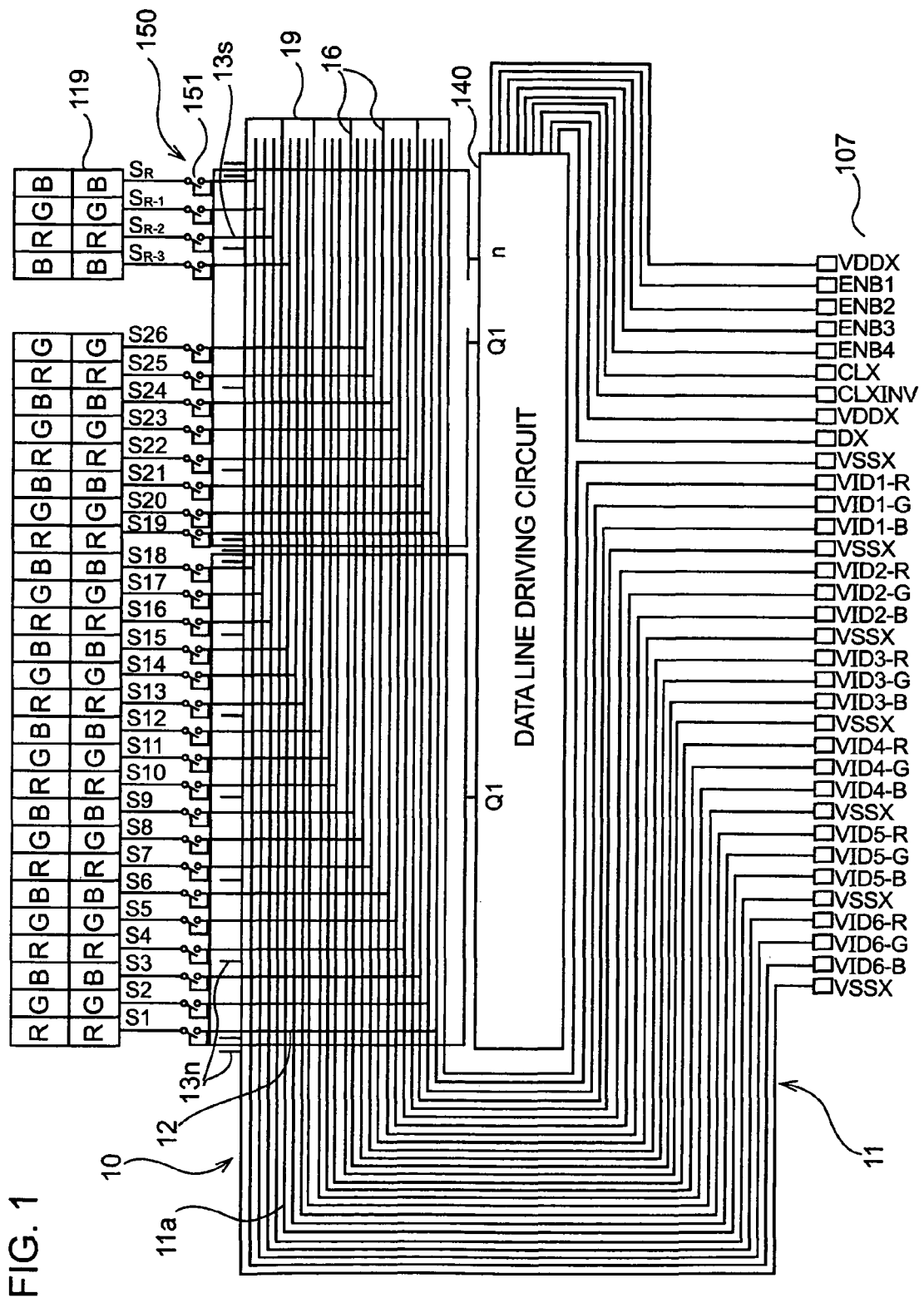
FIG. 1 is a diagram illustrating a wiring line layout which is used for an electro-optical device according to a first embodiment of the invention.
Figure 2:
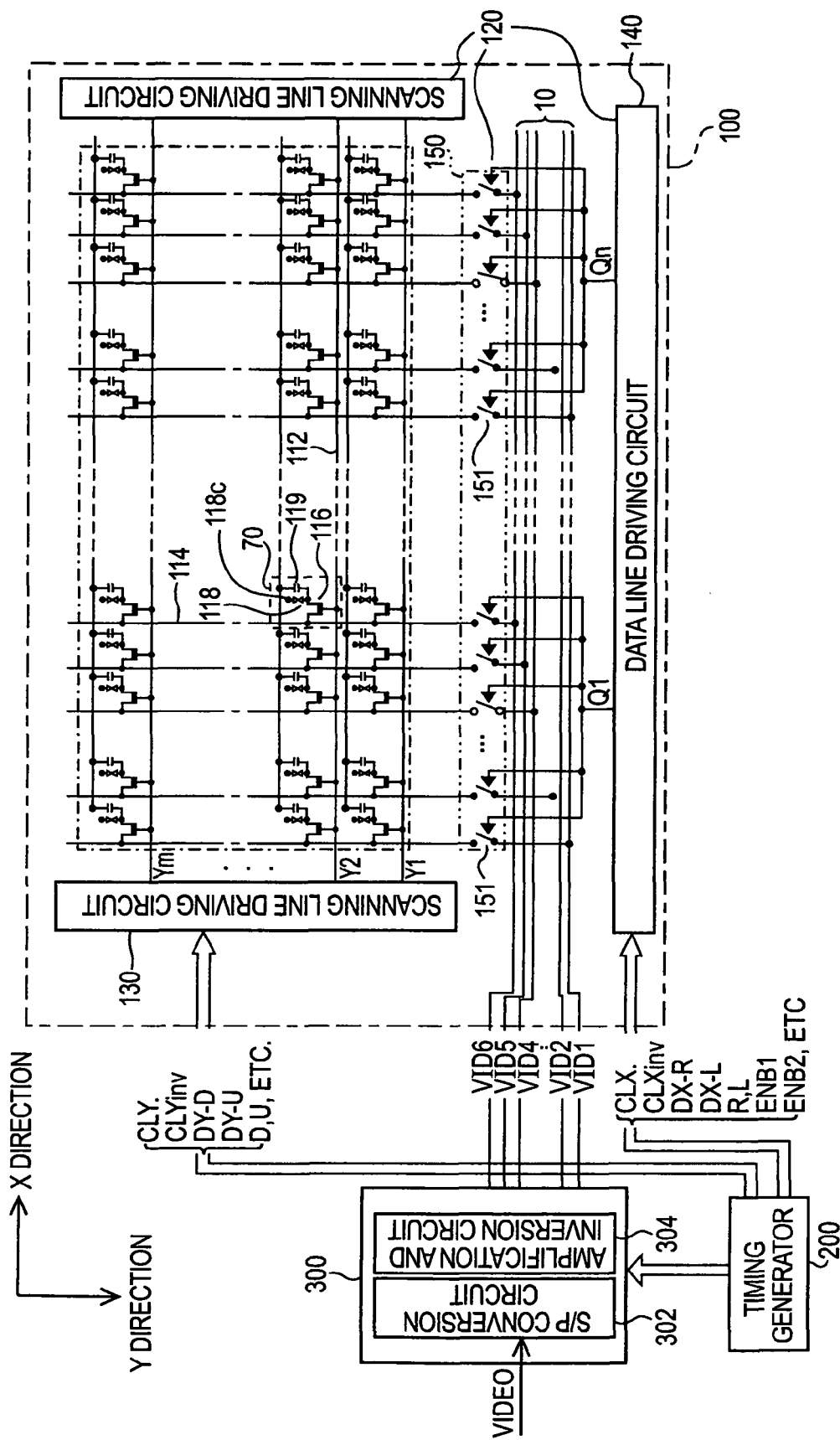
FIG. 2 is a block diagram showing a configuration of the electro-optical device according to the first embodiment.
Figure 3:
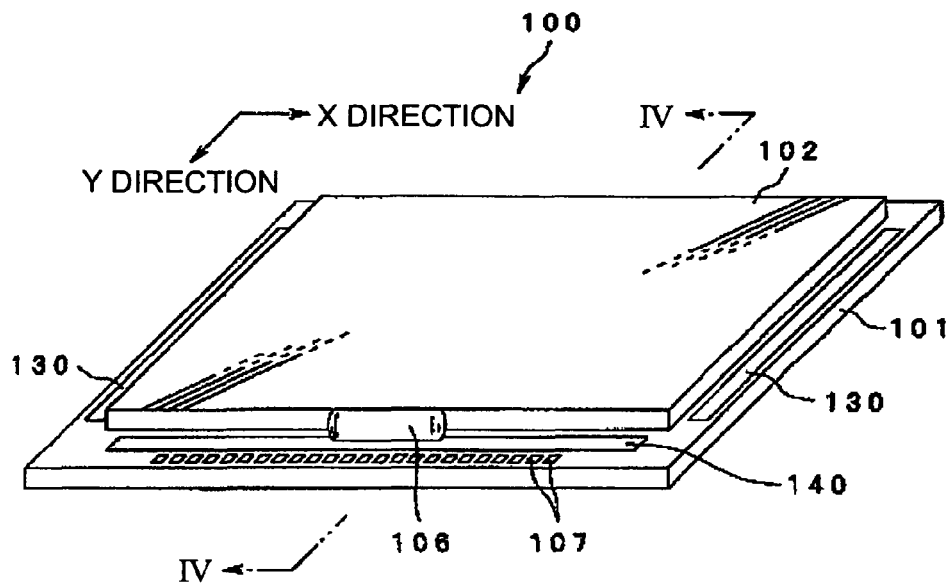
FIG. 3 is a perspective view showing a configuration of a liquid crystal panel 100 shown in FIG. 2.
Figure 4:
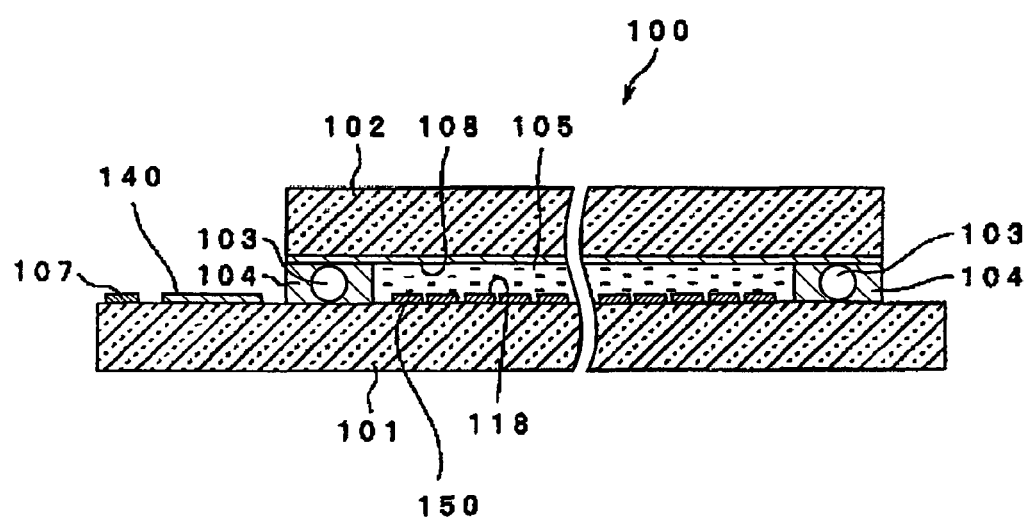
FIG. 4 is a cross-sectional view taken along the line IV-IV' of FIG. 3.

First, a first embodiment of the invention will be described with reference to FIGS. 1 to 6. FIG. 1 is a diagram illustrating a wiring line layout which is used for an electro-optical device according to the first embodiment of the invention. FIG. 2 is a block diagram showing a configuration of the electro-optical device according to the first embodiment. In the present embodiment, a liquid crystal device which uses liquid crystal is described as an example of an electro-optical device. FIG. 3 is a perspective view showing a configuration of a liquid crystal panel 100 shown in FIG. 2. FIG. 4 is a cross-sectional view taken along the line IV-IV of FIG. 3.

To begin with, the configuration of the electro-optical device will be described with reference to FIGS. 2 to 4.

As shown in FIG. 2, a liquid crystal device includes a liquid crystal panel 100 as a display unit, a timing generator 200, and an image signal processing circuit 300. The timing generator 200 outputs timing signals, control signals, and the like to be used in respective parts. An S/P (serial to parallel) conversion circuit 302 in the image signal processing circuit 300 receives a group of image signals Video, performs a serial-parallel conversion into 6 image signal, and outputs the converted image signals so as to perform writing through a phase expansion. Here, the reason for the serial-parallel conversion of the image signals into six image signals is to ensure a sufficient sampling time and a charging/discharging time by lengthening the application time of the image signals to source regions of TFTs constituting sampling switches 151 in a sampling circuit 150. Specifically, the serial-parallel conversion is to prevent a driving frequency of sampling circuit 15 from being increased excessively.

In addition, particularly in the present embodiment, the group of input image signals Video having three parallel image signals, which are used to display a color image in which one pixel has three RGB subpixels in advance prior to being input to the image signal processing circuit 300. Alternately, if image signals according to three RGB subpixels are input in series as the group of image signals Video, these image signals are de-multiplexed by the image signal processing circuit 300 and output as three parallel image signals for each data sequence from the image signal processing circuit 300. In any case, the image signal processing circuit 300 outputs m×n color image signals in total, which are divided into m parallel data sequences for the phase expansion and in which each data sequence has n parallel image signals, such that a color image display can be performed with respective pixels, each pixel having three RGB subpixels.

In FIG. 2, for the purpose of convenience of explanation, the image signals outputted from the image signal processing circuit 300 are collectively indicated as 6 sequences of image signals VID1 to VID6. In the present embodiment, actually, m is 6 and n is 3. That is, each of the six sequences of image signals VID1 to VID6 subjected to the phase expansion has three parallel image signals for each RGB component. Specifically, the image signals VID1 to VID6 are supplied through three signal wiring lines, respectively; that is, they are totally supplied through a wiring line portion 10 including 18 (3×6) image signal lines. An actual wiring layout of these 18 image signal lines and the like will be described below (see FIGS. 1 and 5).

An amplification and inversion circuit 304 serves to invert the serial-parallel converted image signals, if necessary, amplify the inverted image signals appropriately, and supply the amplified image signals to the liquid crystal panel 100 in parallel. Whether or not the image signals are to be inverted is generally determined depending on whether data signals are applied with a polarity inversion for each scanning line 112, a polarity inversion for each data line 114, or a polarity inversion for each pixel. Further, an inversion cycle is set to one horizontal scanning period or dot clock cycle.

Moreover, the polarity inversion means that a voltage level is inverted alternately between positive and negative polarities with reference to an amplitude-centered potential of an image signal. For example, with the potential of a counter electrode or a common potential as the reference potential, the voltage level is inverted alternately between the positive and negative sides of the reference potential. Alternatively, with a ground potential or a grand potential as the reference potential, the voltage level may be inverted alternately between the positive and negative sides of the reference potential. In addition, although the timing at which the six sequences of image signals VID1 to VID6 are supplied to the liquid crystal panel 100 are made simultaneous in the liquid crystal device shown in FIG. 2, these timings may be sequenced in synchronization with the dot clock. In this case, the six sequences of image signals are sampled by a sampling circuit, which will be described below.

FIG. 2 shows a case where six-phase expansion is used to drive the display panel 100. In this case, the sampling circuit 150 samples image signals simultaneously according to a corresponding one of sampling signals Q1, . . . , Qn and supplies the sampled image signals to a data line 114 belonging to a group (block) including 18 (6 (the number of data sequences)×3 (the number of subpixels)) data lines 114 corresponding to 6 pixels. Specifically, the sampling circuit 150 includes switches 151 provided for the respective data lines 114, and each of the switches 151 is inserted between one end of the data line 114 and a signal line to which one of the image signals is supplied. The sampling signals Q1, . . . , Qn are supplied to gates of the switches 151.

In the liquid crystal panel 100, each pixel has three subpixels (R, G and B subpixels), which can be independently controlled by three primary color signals (R, G and B signals), for a color display. Each of the 6 sequences of image signals VID1 to VID6 from the image signal processing circuit 300 includes three image signals regarding the R, G and B subpixels.

Here, when signals of the subpixels are distinguished for each sequence of image signals VID1 to VID6, 18 (6 sequences×3 RGB subpixels) image signals are denoted by VID1-R, VID1-G, VID1-B, VID2-R, . . . , VID6-R, VID6-G, and VID6-B. The 18 image signals are supplied in parallel from the image signal processing circuit 300 to the sampling circuit 150 via the wiring line portion 10, including 18 signal wiring lines through which the 18 image signals are transmitted.

The driving circuit 120 as a driving unit includes at least a scanning line driving circuit 130, a data line driving circuit 140, and the sampling circuit 150. Since the driving circuit 120 is composed of combinations of P-channel TFTs and N-channel TFTs formed by a manufacturing process common to the TFTs 116 for driving the pixels, improvement of manufacturing efficiency, lowering of the production costs and uniformity of element characteristics can be achieved.

The data line driving circuit 140 outputs the sampling signals sequentially by shifting a transmission start pulse DX-R or DX-L, which is supplied at the beginning of the horizontal scanning period, according to a clock signal CLX and an inverted clock signal CLXinv. All of the clock signal CLX, the inverted clock signal CLXinv, the transmission start pulse DX-R (or DX-L) and enable signals (pulse-width limiting signals) ENB1 and ENB2 are supplied in synchronization with the image signals VID1 to VID6 by the timing generator 200.

In addition, if horizontal scanning is performed in the right direction, the transmission start pulse DX-R is supplied at the beginning of the horizontal scanning period and, simultaneously, a transmission control signal R becomes active. On the other hand, if the horizontal scanning is performed in the left direction, the transmission start pulse DX-L is supplied at the beginning of the horizontal scanning period and, simultaneously, a transmission control signal L becomes active. As such, in the present embodiment, the data line driving circuit 140 is of a bi-directional type. However, the data line driving circuit 140 may be of a unidirectional type regarding any one of the transmission start pulses DX-R and DX-L.

The scanning line driving circuit 130 has the same basic configuration as the data line driving circuit 140 except for a difference in the direction of an output signal, an input signal, or a driving frequency. Specifically, the scanning line driving circuit 130 is arranged at a position from the data line driving circuit 140 by 90 degrees and is inputted with a pulse DY-D (or DY-U) and a transmission control signal D (or U), instead of the pulse DX-R (or DX-L) and the transmission control signal R (or L), and a clock signal CLY and an inverted clock signal CLYinv for each horizontal scanning period, instead of the clock signal CLX and the inverted clock signal CLXinv. With this configuration, the scanning line driving circuit 130 outputs scanning signals Y1, . . . , Ym sequentially.

In addition, if vertical scanning is performed in the downward direction, the pulse DY-D is supplied at the beginning of the vertical scanning period and simultaneously the transmission control signal D becomes active. On the other hand, if the vertical scanning is performed in the upward direction, the pulse DY-U is supplied at the beginning of the vertical scanning period and simultaneously the transmission control signal U becomes active. As such, in the present embodiment, the scanning line driving circuit 130 is of a bi-directional type. However, the scanning line driving circuit 130 may be of a unidirectional type regarding any one of the transmission start pulses DY-D and DY-U.

In addition, the clock signal CLY, the inverted clock signal CLYinv, and the pulse DY-U (or DY-D) are supplied in synchronization with the image signals VID1 to VID6 by the timing generator 200 shown in FIG. 2. In addition, these signals and the transmission signal R (or L) are signals converted into signals having a high logic amplitude by a level shifter (not shown).

FIG. 3 is a perspective view showing the configuration of the liquid crystal panel 100 shown in FIG. 2 and FIG. 4 is a cross-sectional view taken along the line IV-IV' of FIG. 3.

The liquid crystal panel 100 includes an element substrate 101 on which various elements or pixel electrodes 118 are formed, a counter substrate 102 on which a counter electrode 108 is formed, which are bonded to each other in such a manner that electrode formation surfaces of them are made to face each other with a constant gap therebetween by means of a sealing member 104 including spacers 103, and liquid crystal 105 of, for example, a TN (twisted nematic) type sealed in the space as an electro-optical material.

The element substrate 101 is made of glass, semiconductor, quartz, or the like, and the counter substrate 102 is made of glass or the like. In addition, if a non-transparent substrate is used as the element substrate 101, the element substrate 101 is of a reflection type, not a transmission type. In addition, the sealing member 104 is formed along the circumference of the counter substrate 102 and has an opening portion through which the liquid crystal 105 is sealed into the space. After the liquid crystal 105 is sealed, the opening portion is sealed by a sealing material 106.

Next, the data line driving circuit 140 is formed on an opposite surface of the element substrate 101 in a region of one outer-side line of the sealing member 104 having a configuration where the sampling signals are output. In addition, while the data line driving circuit 140 is formed in the outer-side line of the sealing member 104, the wiring line portion 10 (see FIG. 2) including the image signal lines, the sampling circuit 150, and the like are formed in the vicinity of a region in which the sealing member 104 is formed. In addition, a plurality of mounting terminals 107 is formed in an edge of the outer-side line of the sealing member 104. Various signals are input from an external circuit (for example, the image signal processing circuit 300 shown in FIG. 2) through the plurality of mounting terminals 107.

In addition, the scanning line driving circuits 130 are formed on two side regions adjacent to the outer-side line of the sealing member 104, respectively, having a configuration where the scanning lines are driven in the two side regions. In addition, if a delay of the scanning signals supplied to the scanning lines causes no problem, the scanning line driving circuit 130 may be formed in only one side region.

On the other hand, the counter electrode 108 formed on the counter substrate is electrically connected to the element substrate 101 in at least one of the four corners in a portion bonded to the element substrate 101 by vertical connecting members. In addition, though particularly not shown, a colored layer (color filter) is formed in a region opposite to the pixel electrodes 118 on the counter substrate 102. Of course, the colored layer (color filter) may be formed on the element substrate 101.

Alignment films (not shown in FIG. 4), which are subjected to a rubbing treatment, are formed on opposite sides of the element substrate 101 and the counter substrate 102, respectively. In addition, polarizers (not shown) are formed along alignment directions of the alignment films on rear surfaces of the element substrate 101 and the counter substrate 102, respectively. In FIG. 4, though the counter electrode 108, the pixel electrodes 118, and the mounting terminals 107 are shown to have a certain thickness, this is to indicate their formation positions for the sake of convenience, and actually, the thickness is so small that it can be neglected with respect to the substrates.

In the liquid crystal panel 100, as shown in FIG. 2, on the element substrate are formed the plurality of scanning lines 112 in parallel to the X direction and the plurality of data lines 114 in parallel to the Y direction, which is orthogonal to the X direction. In addition, at intersections of the scanning lines 112 and the data lines 114, gate electrodes of the TFTs 116 serving as the switches for controlling subpixel portions 70 are connected to the scanning lines 112, source electrodes of the TFTs 116 are connected to the data lines 111, and drain electrodes of the TFTs 116 are connected to the pixel electrodes 118. Liquid crystal capacitors 118c are formed by the pixel electrodes 118 and the common electrode formed on the counter substrate for each subpixel portion 70. As a result, the subpixel portions 70, each of which can be driven in the form of a matrix, are arranged in a matrix shape on an image display region to correspond to intersections of the scanning lines 112 and the data lines 114. In addition, in each subpixel portion 70, a storage capacitor 119 is formed in parallel to the liquid crystal capacitor 118c.

FIG. 1 shows a wiring layout of the mounting terminal 107, the data line driving circuit 140, and the sampling circuit 150 according to present embodiment described with reference to FIGS. 2 to 4.

Each of the six sequences of image signals VID1 to VID6 input to the mounting terminals 107 includes image signals of three RGB subpixels. That is, the image signals include 18 parallel image signals VID1-R, VID1-G, VID1-B, VID2-R, . . . , VID6-G, and VID6-B in total and are input from 18 mounting terminals 107 and then transmitted to the element substrate 101 through the wiring line portion 10 including the 18 image signal lines. As shown in FIG. 1, the mounting terminals 107 are inputted with a supply voltage VDDX, enable signals ENE1 TO ENB4, a clock CLX, an inverted signal CLXINV, and the like, in addition to the image signals, all of which are supplied to the data line driving circuit 140. In addition, in the present embodiment, a supply voltage VSSX is supplied to a mounting terminal between a plurality of groups of mounting terminals, each of which includes three mounting terminals to which the image signals of the three subpixels for each data sequence are input. The supply voltage VSSX is a supply voltage (reference voltage) having a low-level potential of the data line driving circuit 140.

As shown in FIGS. 3 and 4, the mounting terminals 107 are arranged to align with an edge of the panel. The wiring lines of the wiring line portion 10 are connected to the mounting terminals 107, respectively. The wiring lines of the wiring line portion 10 extend toward the data line driving circuit 140 perpendicularly to the edge of the panel on which the mounting terminals 107 are disposed, bent in a longitudinal direction (the direction of the scanning lines 112) of the data line driving circuit 140, and disposed along the long side line of the data line driving circuit 140. A group of theses signal lines constitutes a main line portion 11.

Each wiring line (hereinafter, referred to as a main line) of the main line portion 11 is bent at an angular portion of the data line driving circuit 140 and is disposed along the short side line of the data line driving circuit 140. Then, the wiring line is bent toward a region between the data line driving circuit 140 and the sampling circuit 150 and is disposed along the long side line between these circuits.

The image signals of the three subpixels constituting one data sequence are transmitted by three adjacent wiring lines (signal wiring lines), which are an example of 'a group of signal wiring lines' according to the invention. In the present embodiment, for each three wiring line that transmits the image signals of one data sequence having the image signals of three subpixels, wiring lines to which the supply voltage VSSX is applied are disposed as shield lines 16. The shield lines 16 are also disposed at the outermost side of the main line portion 11, and end portions of the shield lines 16 are interconnected to form a termination portion 19.

In addition, an application method of data to each wiring line may be changed depending on a driving method.

Each main line 11a of the main line portion 11 that transmits the image signals is connected to each relay wiring line 12 that extends to the sampling circuit 150. Each relay wiring line 12 serving as a relay signal wiring line is connected to a corresponding switch 151 of the sampling circuit 150 via a corresponding lead wiring line 13s which serves as a lead signal wiring line. In FIG. 1, the respective elements of the sampling circuit 150 are not shown and only the switches 151 for determining the sampling timing are shown.

FIG. 1 shows an example of 6×n pixels (=18×n subpixels) as the number of pixels in the horizontal direction of the liquid crystal panel 100. Specifically, 18 main lines 11a of the main line portion 11 that transmit the image signals VID1-R, VID1-G, VID1-B, VID2-R, . . . , VID6-G, and VID6-B are connected to 18 relay wiring lines 12 in each block, respectively, and also, each relay wiring line 12 is connected to each of 18 lead wiring line 13s in each block. Each of the lead wiring lines is connected to each of 18 switches 151 in each block.

In the present embodiment, for the main line portion 11, the shield lines 16 are disposed for each data sequence of blocks, and also, each of lead wiring lines 13n (referred to as shield lines 13n) as shield lead wiring lines is disposed for each of three lead wiring lines 13n, which are an example of 'a group of branch wiring lines' corresponding to each data sequence according to the invention. That is, the shield lines 16 disposed at the outermost side of a sample and hold circuit 150 of the main line portion 11 are branched in the direction of the data lines 114 and extend up to a portion (lead out wiring line portion) between a boundary of each data sequence and the sampling hold circuit 150 along the lead wiring lines 13s for every three draw wiring lines 13s that transmitting one data sequence, thereby forming the shield lines 13n.

The data line driving circuit 140 outputs the sampling signals Q1, Q2, . . . , Qn, which are common for each block, to the switches 151 in the blocks. That is, in the present embodiment, six sequences of 18 image signals VID1-R, VID1-G, VID1-B, VID2-R, . . . , VID6-G, and VID6-B are simultaneously input to 18 data lines. In the present embodiment, the wiring lines that transmit the sampling signals Q1, Q2, . . . , Qn are separated from other signal lines by the shield lines 13n in the lead wiring line portion.

In addition, in the sampling circuit 150, the switches 151 connected to the data lines are turned on by the sampling signals. The sampling circuit 150 inputs data corresponding to image signals, which are transmitted through the lead wiring lines 13s, to the subpixels 119.

Figure 5:
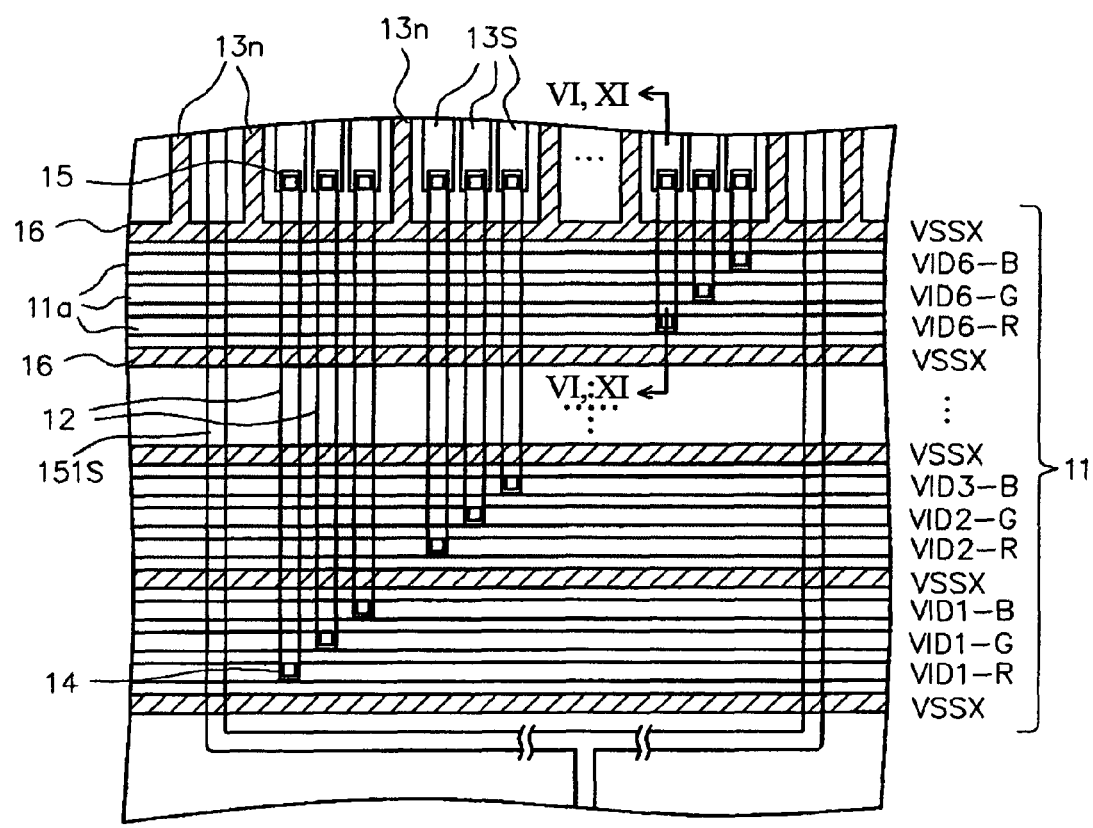
FIG. 5 is a plan view showing a layout of main lines, relay wiring lines, and lead wiring lines.
Figure 6:
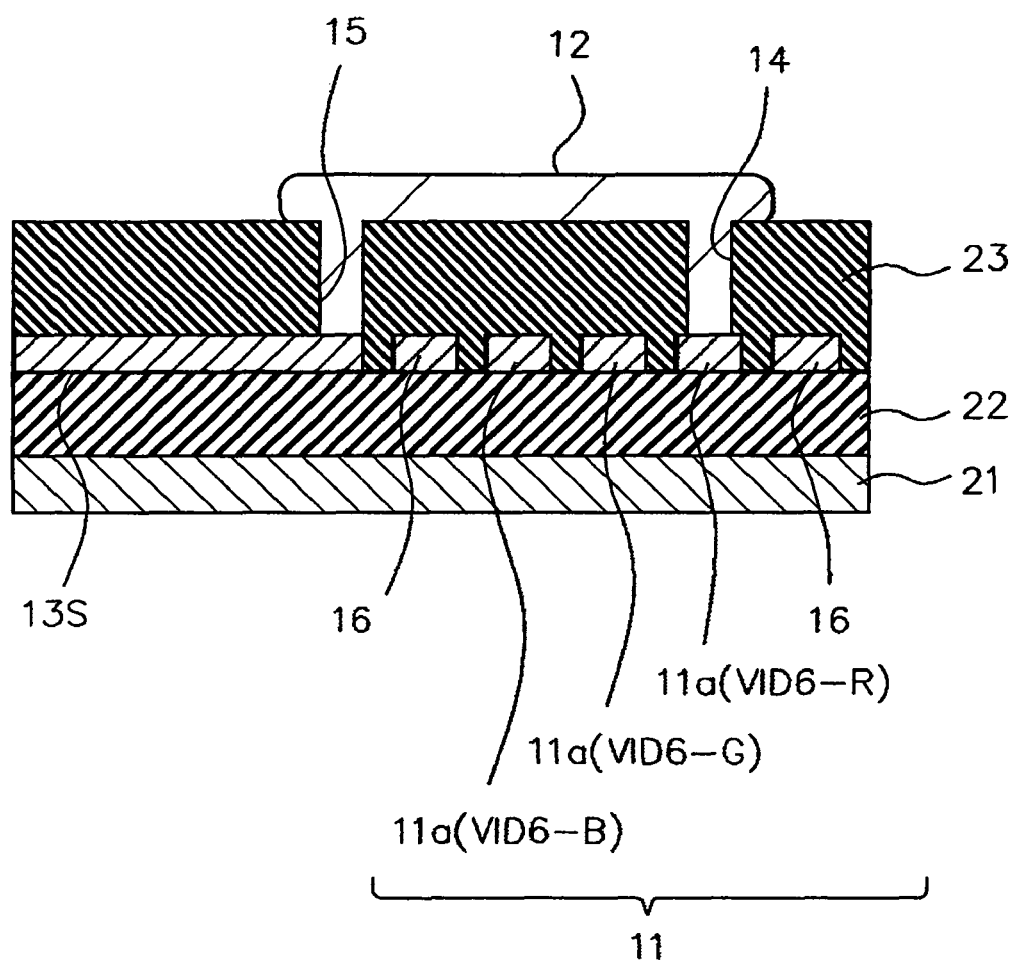
FIG. 6 is a cross-sectional view taken along the line VI-VI of FIG. 5.

FIG. 5 is a plan view illustrating a layout of the main lines, the relay wiring lines, and the lead wiring lines according to the present embodiment. FIG. 6 is a cross-sectional view taken along line the VI-VI' of FIG. 5. The electro-optical device according to present embodiment can be manufactured by the same film formation technique, patterning technique, and the like as semiconductor devices. In the present embodiment, the relay wiring lines and the lead wiring lines are generally called 'branch wiring lines' or 'branch wiring line portions' in the sense that they are branched from the main line portion.

As shown in FIGS. 5 and 6, the main lines 11a of the main line portion 11 are connected to the relay wiring lines 12 through contacts (contact holes) 14. That is, an insulating layer 22 is formed on a substrate 21, and the main lines 11a including the shield lines 16 of the main line portion 11, the lead wiring lines 13s (see FIGS. 5 and 6) for supply of the image signals, and the shield lead wiring lines 13n (see FIG. 5) led from the shield lines 16 are patterned on the insulating layer 22. In FIG. 6, signals applied to the main lines 11a are denoted by VID6-B . . . , and the like in parentheses. A layer including the relay wiring lines 12 is formed, via an interlayer insulating layer 23, on a layer on which the main line portion 11 is formed. The relay wiring lines 12 are respectively connected to the underlying main lines 11a via respective contacts (contact holes) 14 and, as shown in FIG. 5, extend in a direction perpendicular to the main lines 11a. Each relay wiring line 12 is connected to an underlying corresponding lead line 13s via a contact 15 formed in the lead wiring portion.

FIG. 6 shows a state in which the main line 11a for transmitting the image signal VID5-B of a subpixel is connected to the lead wiring line 13s formed on the same layer as the main line 11a via the contact 14, the relay wiring line 12, and the contact 15. Other main lines 11a for transmitting the image signals have the same configuration as shown in FIG. 6.

In addition, in the present embodiment, the shield line 16 disposed at the outermost side of the main line portion 11 is formed among three lead wiring lines 13s for transmitting one data sequence and is branched to the sample hold circuit 150 form the lead wiring line 13n (see FIGS. 1 and 5). That is, the lead wiring line 13n is disposed along the lead wiring line 13s for each lead wiring line 13s of one data sequence as an example of the group of branch wiring lines according to the invention. In addition, as shown in FIG. 5, the lead wiring line 13n is disposed on both sides of sampling signal lines 151s to which the sampling signal Q1, Q2, . . . , Qn are supplied, thereby electromagnetically shielding the lead wiring line 13n. Accordingly, the noise to the sampling signals Q1, Q2, . . . , Qn can be reduced or the noise from the sampling signals Q1, Q2, . . . , Qn can be reduced.

In the present embodiment having the above-described configuration, the shield line 16 and the lead wiring line 13n are disposed, as shield lines for each data sequence for the phase expansion, in the main line portion 11 and the lead wiring line portion extending in a direction perpendicular to the main line portion 11. Accordingly, the image signals of each data sequence can be prevented from deteriorating by the effect of the image signals of other data sequences. If the shield lines are disposed among all wiring lines, it has an advantage with respect to the prevention of noise. However, since this increases the number of wiring lines, it is not suitable for a phase expansion driving method for a color display. The present embodiment suppresses the number of wiring lines from being increased and allows noise to be removed effectively by using the shield line disposed for each data sequence.

Particularly, since the region (lead wiring line portion) between the main line and the sampling circuit 150 is a region in which the sealing member 103 (see FIG. 4) for bonding the element substrate 101 to the counter substrate 102 is disposed and which has a relatively long distance, the shield line disposed for each data sequence in the lead wiring line portion is greatly effective in removing the noise. In addition, in the main line portion and the lead wiring line portion, since the shield line is formed on the same layer as the wiring lines for transmitting the image signals and is relatively close to the signal wiring lines accordingly, a high shield effect can be achieved.

For example, while the sampling circuit 150 is disposed closer to the image display region rather than to the sealing region in which the sealing member 104 shown in FIG. 4 is disposed (for example, in the region in which a frame-shaped light shielding layer), the shield line 13n may be formed long such that it reaches at least a center of the sealing region in parallel to the lead wiring line 13s.

Second Embodiment

Figure 7:
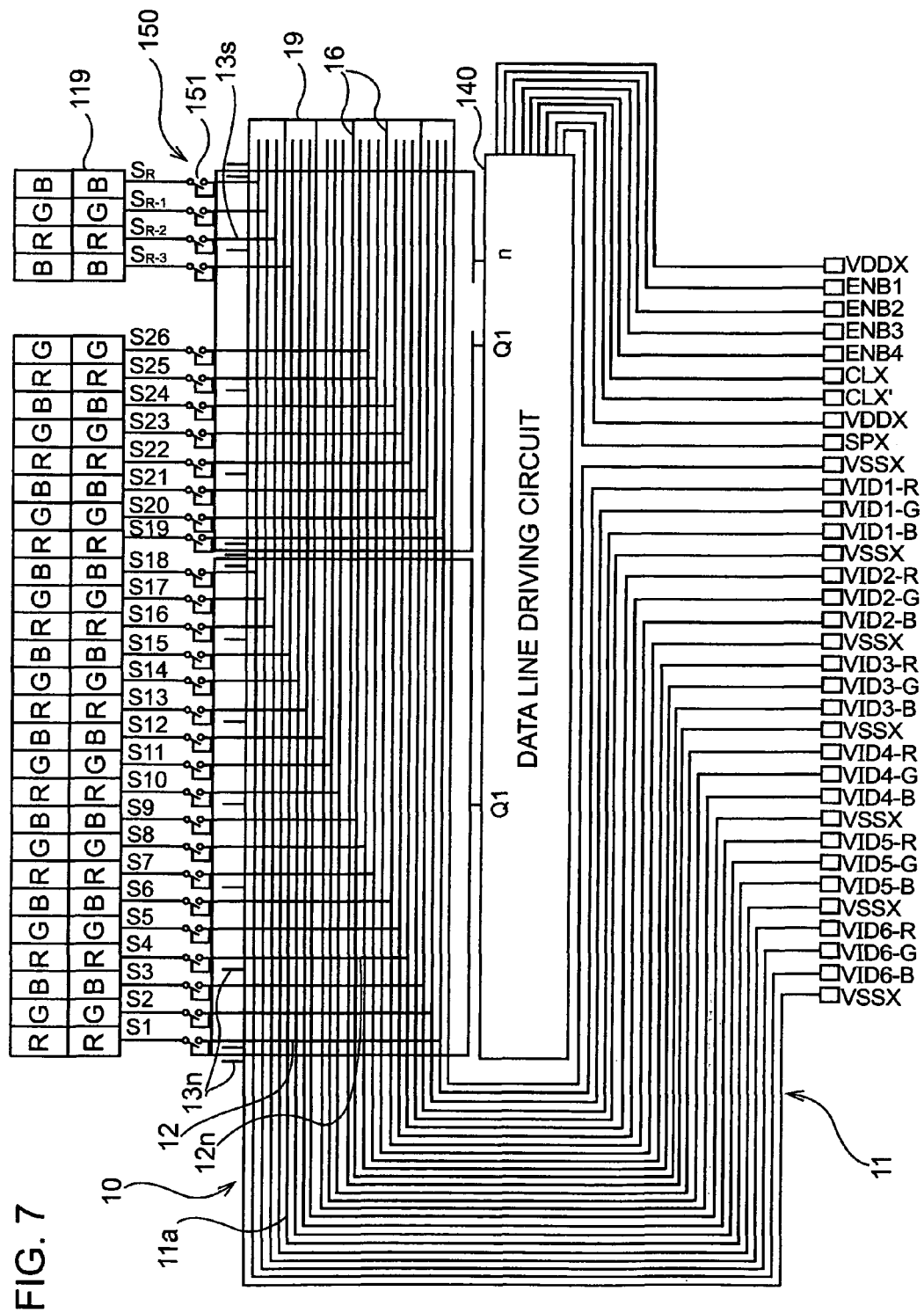
FIG. 7 is a diagram illustrating a wiring line layout which is used for an electro-optical device according to a second embodiment of the invention.
Figure 8:
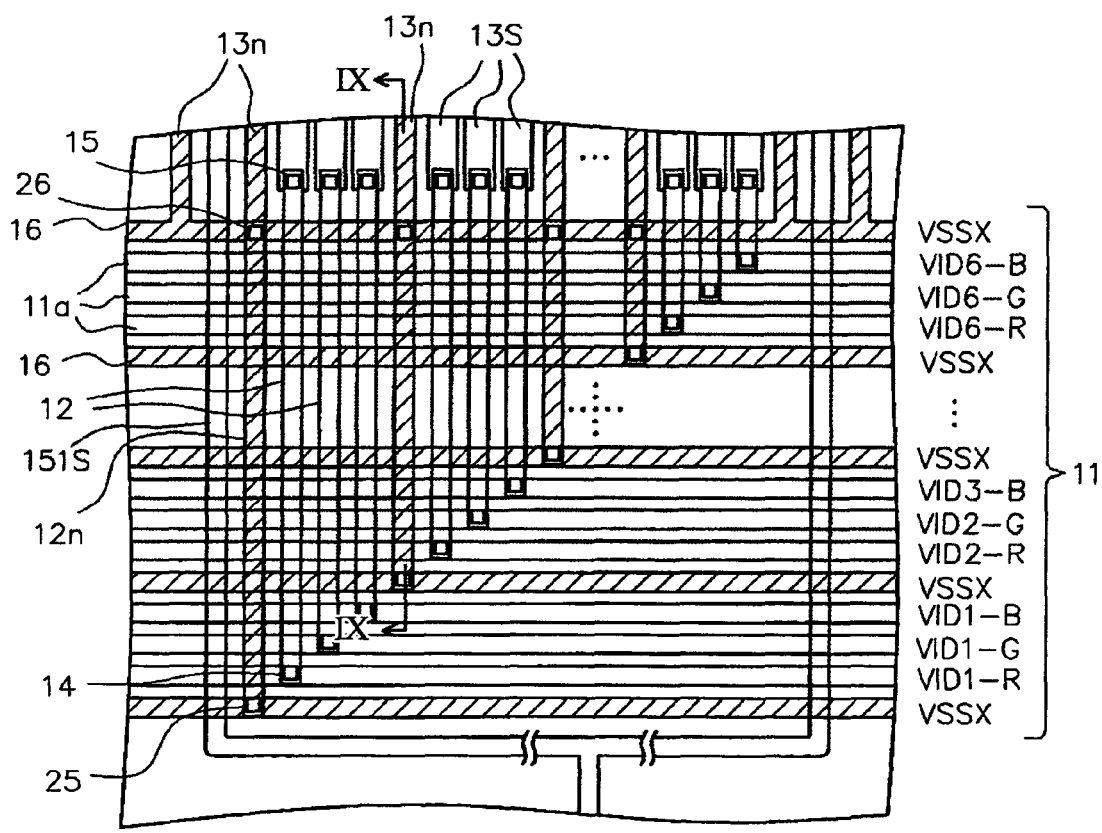
FIG. 8 is a plan view illustrating a layout of main lines, relay wiring lines, and lead wiring lines in the second embodiment.
Figure 9:
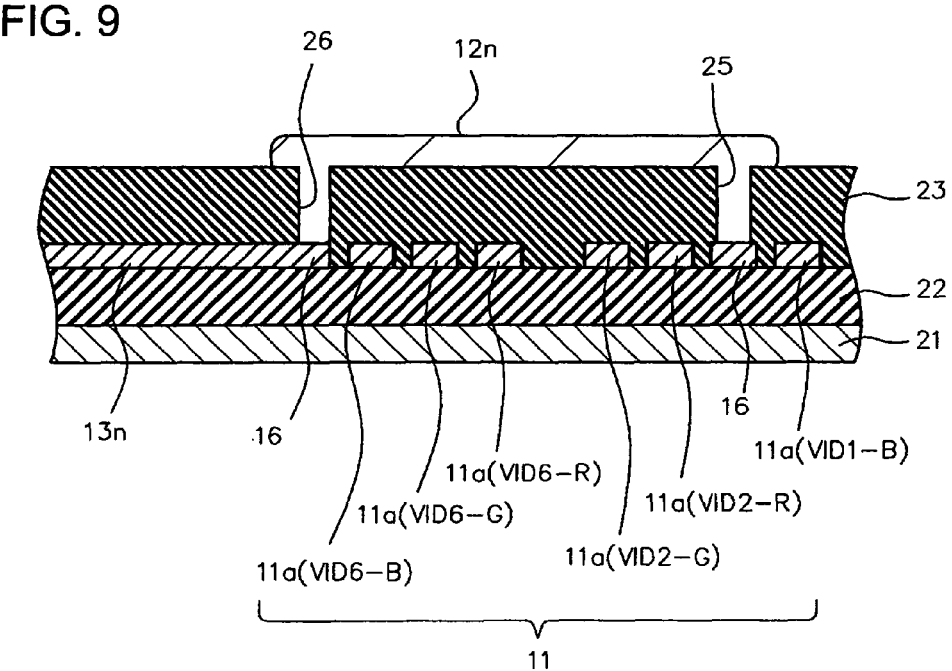
FIG. 9 is a cross-sectional view taken along the line IX-IX' of FIG. 8.

Next, a second embodiment of the invention will be described with reference to FIGS. 7 to 9. With regard to the second embodiment, FIG. 7 is a diagram illustrating a wiring line layout which is used for an electro-optical device according to the second embodiment of the invention, like FIG. 1. FIG. 8 is a plan view illustrating a layout of main lines, relay wiring lines, and lead wiring lines according to the second embodiment, like FIG. 5. FIG. 9 is a cross-sectional view taken along the line IX-IX' of FIG. 8. In FIGS. 7 to 9, the same elements as FIGS. 5 and 6 are represented by the same reference numerals and the descriptions thereof will be omitted. The present embodiment is different from the first embodiment in that the shield lines are disposed along the relay wiring lines 12 serving as the relay signal wiring line to be branched from the main lines 11a.

The first embodiment has the configuration in which the main lines 11a for transmitting the image signals are connected to the lead wiring lines 13s by the relay wiring lines 12. However, in the second embodiment, as shown in FIGS. 7 to 9, a shield line 16, which is not at the outermost side of the main line portion 11, is connected to a shield line 16, which is at the outermost side of the main line 11 by the relay wiring line 12n serving as the shield relay wiring line.

As shown in FIGS. 8 and 9, the main line 11a of the main line portion 11 for transmitting the image signals is connected to the relay wiring line 12 via a contact. The relay wiring line 12 is connected to the lead wiring line 13s via a contact.

In addition, in the present embodiment, as shown in FIGS. 8 and 9, the shield line 16, which is not at the outermost side of the main line portion 11, is connected to the relay wiring line 12n via a contact (contact hole) 25. The relay wiring line 12n is disposed such that the relay wiring lines 12 for transmitting subpixel image signals of one data sequence are partitioned, thereby increasing an effect of removal of noise between data sequences. The relay wiring line 12n is connected to the shield line 16, which is at the outermost side of the main line portion 11 via a contact (contact hole) 26. The configuration in which the shield line 16, which is at the outermost side of the main line portion 11, is connected to the lead wiring line 13n, like the first embodiment.

As shown in FIG. 9, the main line 11a of the main line portion 11 including the shield line 16, and the lead wiring lines 13s and 13n are patterned on the insulating layer 22. In the present embodiment, a layer including the relay wiring line 12 and the relay wiring line 12n is formed on a layer, on which the main line portion 11 is formed, through the interlayer insulating layer 23. Like FIG. 6, the relay wiring line 12 for transmitting the image signals is connected to the underlying main line 11a via a corresponding contact 14 and simultaneously is connected to an underlying corresponding lead line 13s via the contact 15 formed in the lead wiring line portion.

On the other hand, in the present embodiment, the relay wiring line 12n to which the supply voltage VSSX is applied is connected to the shield line 16, which is not at the outermost side of the main line portion 11, via a corresponding contact 25 and simultaneously is connected to the shield line 16, which is at the outermost side of the main line portion 11, via the contact 26 formed in the lead wiring line portion.

FIG. 9 shows a state in which the shield line 16 adjacent to the image signal VID1-B is connected to the outermost shield line 16 formed on the same layer as the shield line 16 adjacent to the image signal VID1-B via the contact 25, the relay wiring line 12n and the contact 26 and extends as the lead wiring line 13n toward the sample hold circuit 150.

The present embodiment having the above-described configuration can obtain the same effect as the first embodiment. In addition, in the second embodiment, in a layer in which the relay wiring line on the layer including the main line portion is transmitted, since the shield line is formed for each relay wiring line for transmitting three image signals of one data sequence, which is an example of the group of branch wiring lines' according to the invention.

In addition, although it has been described in the present embodiment that the liquid crystal is used as an electro-optical material, the invention can be applied to display devices for displaying images using electroluminescent elements and the like having an electro-optical effect. That is, the invention can be applied to all electro-optical devices having a configuration similar to that of the above-described liquid crystal device.

Third Embodiment

Figure 10:
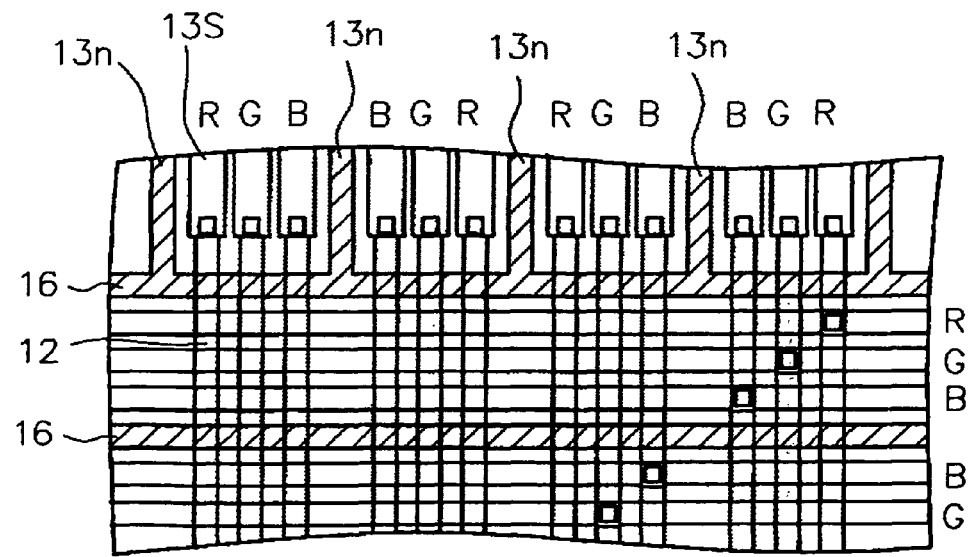
FIG. 10 is a diagram illustrating a wiring layout which is used for an electro-optical device according to a third embodiment of the invention.

Next, a third embodiment of the invention will be described with reference to FIG. 10. FIG. 10 is a plan view illustrating a layout of main lines, relay wiring lines, and lead wiring lines according to the third embodiment, like FIG. 5. In FIG. 10, the same elements as FIG. 5 are represented by the same reference numerals and the description thereof will be omitted. The present embodiment has a feature of an order of arrangement of wiring lines for each RGB in the main line portion and the branch wiring line portion. Other configurations of the present embodiment are the same as those in the first embodiment shown in FIGS. 1 to 6.

More specifically, as shown in FIG. 10, the main line portion is configured such that an order of three main lines 11a belonging to the same pixel, which is an example of 'the group of signal wiring lines' according to the invention, becomes an inverted order alternately for each group so that main lines 11a for red are adjacent to each other with the shield line 16 interposed therebetween or main lines 11a for blue are adjacent to each other with the shield line 16 interposed therebetween. In addition, the branch wiring line portion and the lead wiring portion are configured such that an order of three lead wiring lines 13s belonging to the same pixel, which is an example of 'the group of branch wiring lines' according to the invention, becomes an inverted order alternately for each group so that lead wiring lines 13s for red are adjacent to each other with the lead wiring line 13n as the shield line interposed therebetween or lead wiring lines 13s for blue are adjacent to each other with the lead wiring line 13n as the shield line interposed therebetween.

In a similar manner, for image signals regarding other pixels, the adverse effect due to the electromagnetic noise cannot be perceived on the sense of sight among image signals having the same color. Accordingly, in the third embodiment, the adverse effect of the electromagnetic noise can be effectively reduced.

Fourth Embodiment

Figure 11:
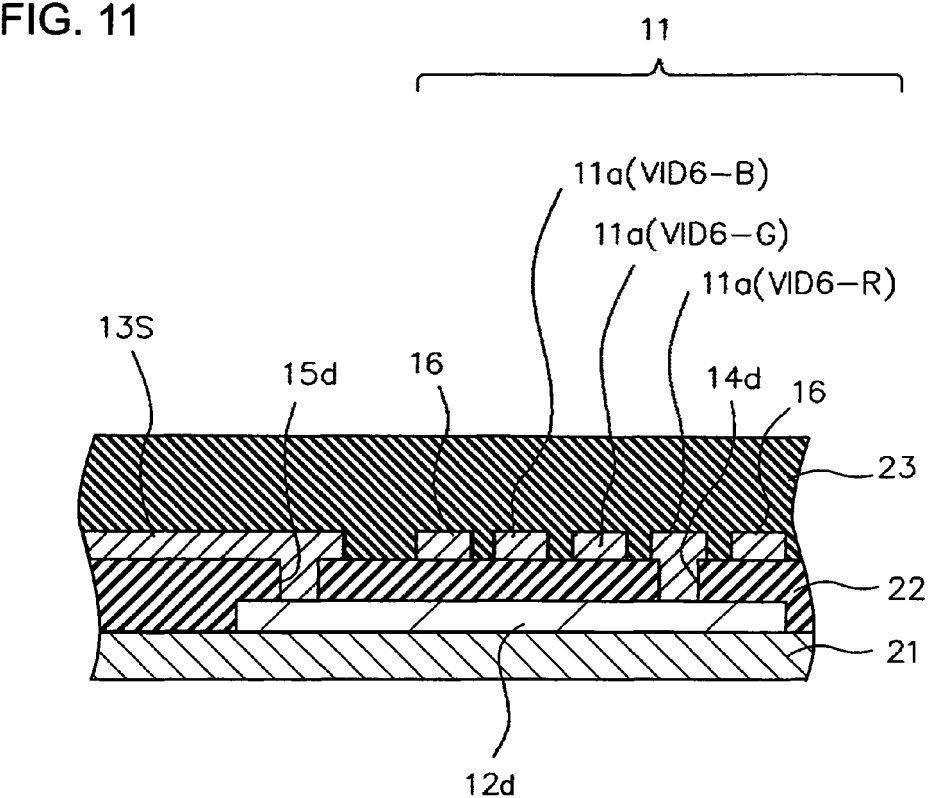
FIG. 11 is a cross-sectional view of a wiring line portion of an electro-optical device according to a fourth embodiment of the invention.

Next, a fourth embodiment of the invention will be described with reference to FIG. 11. FIG. 11 is a cross-sectional view taken along the line VI-VI of FIG. 5 according to the fourth embodiment. In FIG. 11, the same elements as those in FIGS. 5 and 6 are represented by the same reference numerals and the description thereof will be omitted. The present embodiment has a feature of a lamination position of relay wiring lines. Other configurations of the present embodiment are the same as those in the first embodiment shown in FIGS. 1 to 6.

More specifically, as shown in FIG. 11, in the fourth embodiment, a relay wiring line 12d is formed below an interlayer insulating layer 22 and extends toward the lead wiring line 13s from the main line 11a through a lower layer of the main line 11a via contacts (contact holes) 14d and 15d.

Accordingly, the fourth embodiment has a great advantage in practical use since the arrangement of various wiring lines, electrodes, electronic elements, alignment films, liquid crystal, and the like on the interlayer insulating layer 23 is not hindered by the presence of the relay wiring line 12d.

Electronic Apparatus

Figure 12:
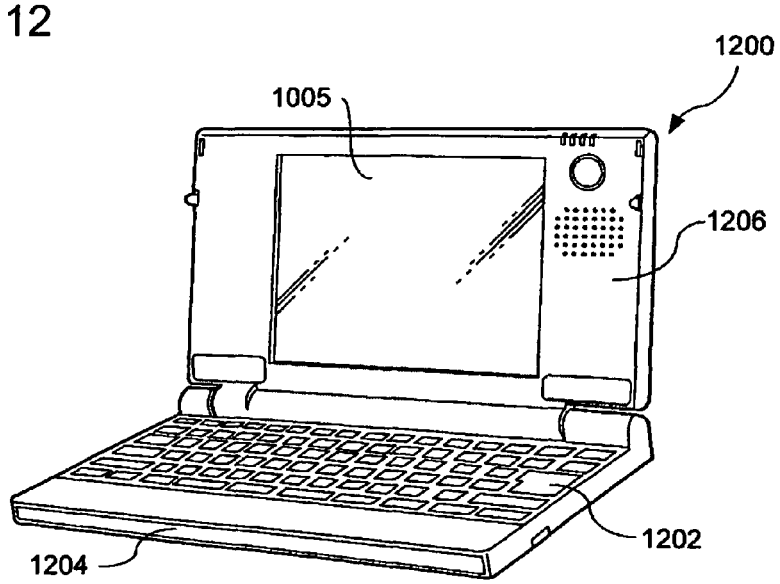
FIG. 12 is a perspective view showing a configuration of a personal computer as an example of an electronic apparatus to which a liquid crystal device is applied.
Figure 13:
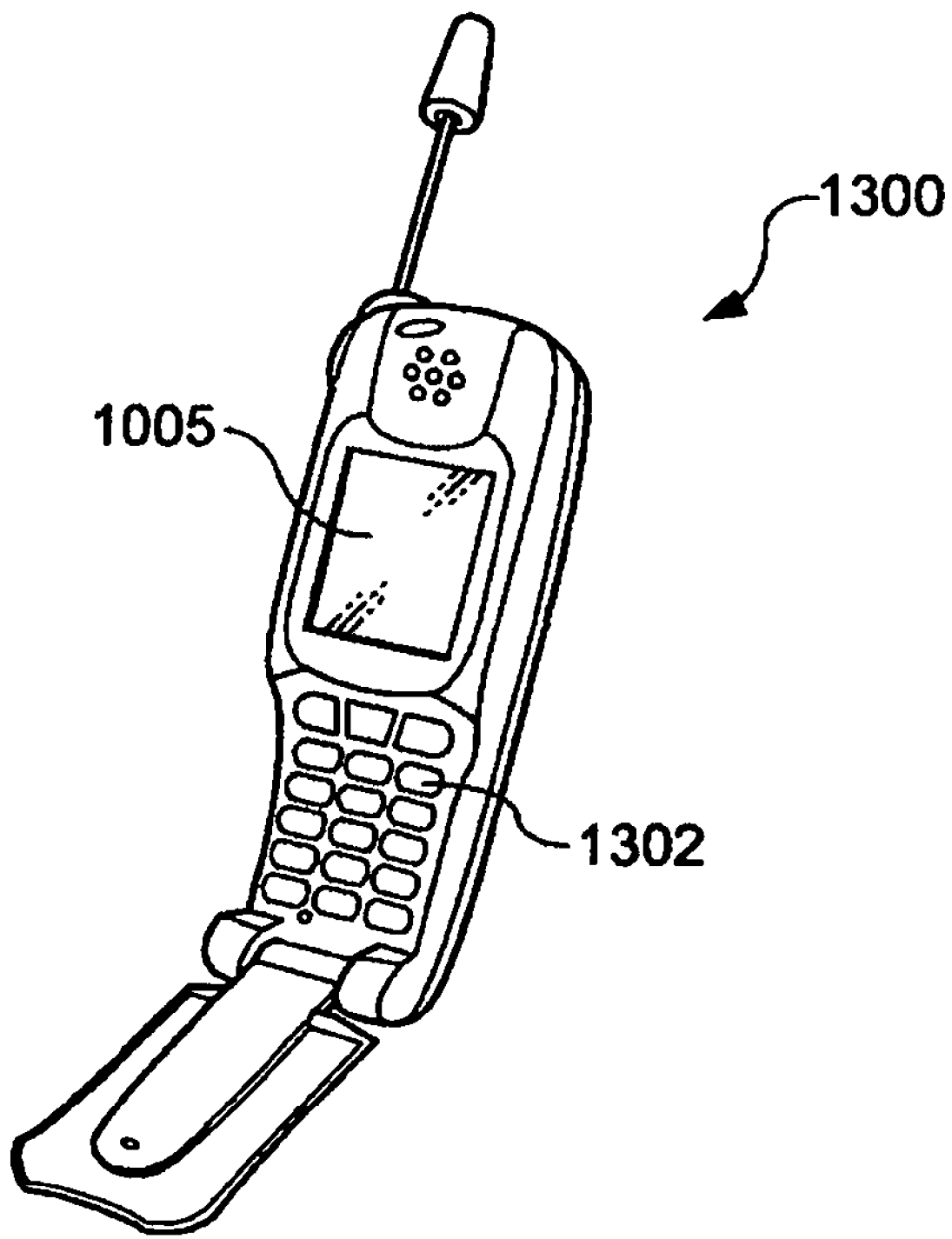
FIG. 13 is a perspective view showing a configuration of a cellular phone as an example of an electronic apparatus to which a liquid crystal device is applied.

Next, cases in which the above-described liquid crystal device is applied to various electronic apparatuses will be described with reference to FIGS. 12 and 13.

An example in which the liquid crystal device is applied to a personal computer will be described. FIG. 12 is a perspective view showing the configuration of a personal computer. In FIG. 12, a computer 1200 includes a body 1204 having a key board 1202 and a liquid crystal display unit 1206. The liquid crystal display unit 1206 includes the above-described liquid crystal device 1005 and a backlight which is attached to the rear surface of the device 1005.

In addition, another example in which the liquid crystal device is applied to a cellular phone will be described. FIG. 13 is a perspective view showing the configuration of the cellular phone. In FIG. 13, a cellular phone 1300 includes a plurality of operating buttons 1302 and a reflective liquid crystal device 1005. A front light is provided in front of the reflective liquid crystal display unit 1005, if necessary.

Further, in addition to the electronic apparatuses described with reference to FIGS. 12 and 13, other electronic apparatuses, such as liquid crystal television sets, view-finder-type or monitor-direct-view-type video tape recorders, car navigation devices, pagers, electronic calculators, word processors, workstations, video phones, POS terminals, and devices having touch panels, or the like, can be exemplified. It is needless to say that the present invention can be applied to these electronic apparatuses.

In addition, the electro-optical device of the invention can be similarly applied to a passive matrix-type liquid crystal display panel as well as an active-matrix-type liquid crystal display panel (for example, a liquid crystal display panel having TFTs (Thin Film Transistors) or TFDs (Thin Film Diodes) as switching elements). Further, the invention can be similarly applied to electroluminescent devices, organic electroluminescent devices, plasma display devices, electrophoretic display devices, devices using electron emission (Field Emission Displays, Surface-Conduction Electron-Emitter Displays, or the like), DLPs (Digital Light Processing) or DMDs (Digital Micromirror Devices), or the like, in addition to the liquid crystal panel.

The invention is not limited to the above-described embodiments and various modifications can be made within the scope without deviating from the subject matter or spirit of the invention read on the appended claims and the specification. An electro-optical device and an electronic apparatus having the electro-optical device that accompany such modifications still fall within the technical scope of the invention.

What is claimed is:

1. An electro-optical device comprising:
a display unit that has a plurality of switching elements provided at intersections of a plurality of scanning lines and a plurality of data lines and that drives the plurality of switching elements based on image signals supplied to the plurality of data lines so as to display images;
a driving unit that controls driving of the display unit through a phase expansion so as to drive the plurality of switching elements for predetermined blocks;
m×n signal wiring lines that transmit image signals, the image signals being divided into m (where m is a natural number of 2 or more) parallel data sequences and each of the data sequences including n (where n is a numerical value of 2 or higher and also a natural number of less than or equal to m) parallel image signals, and that have extended portions such that the m×n signal wiring lines are grouped into a plurality of groups of signal wiring lines, each of the plurality of groups of signal wiring lines including n signal wiring lines for each data sequence on a substrate, and such that the plurality of groups of signal wiring lines for each data sequence are grouped;

a plurality of supply voltage lines being applied a supply voltage, wherein at least one of the supply voltage lines is formed between two adjacent groups of the plurality of groups of signal wiring lines, runs along one of the signal wiring lines of the two adjacent groups in the extended portions, and is not formed between two adjacent signal wiring lines of a same group of the plurality of groups of signal wiring lines;

at least one sampling signal line supplied with a sampling signal from the driving unit, wherein at least a portion of each sampling signal line is adjacent and between two shield lines from a plurality of shield lines, the plurality of shield lines being applied the supply voltage, the plurality of shield lines being branched in a direction of the plurality of data lines, from one of the supply voltage lines; and a plurality of mounting terminals, the signal wiring lines being disposed between the plurality of mounting terminals and the driving unit, the plurality of groups of signal wiring lines each being comprised of more than one group of signal wiring lines.

2. The electro-optical device according to claim 1, wherein signal wiring lines of one of the plurality of groups transmit image signals of n subpixels constituting one pixel and corresponding to n colors as the n parallel image signals for each data sequence.

3. The electro-optical device according to claim 2, wherein the supply voltage lines formed between two adjacent groups of the plurality of signal lines are arranged adjacent to signal wiring lines of one of the plurality of groups that transmit image signals of subpixels corresponding to the colors, excluding green, of the n colors.

4. The electro-optical device according to claim 2, wherein signal wiring lines of one of the plurality of groups that transmit image signals of subpixels corresponding to green of the n colors are disposed between signal wiring lines of one of the plurality of groups that transmit image signals of subpixels corresponding to red of the n colors and signal wiring lines of one of the plurality of groups that transmit image signals of subpixels corresponding to blue of the n colors.

5. The electro-optical device according to claim 2, wherein the signal wiring lines of the one of the plurality of groups that transmit the image signals of the subpixels corresponding to the same color of the n colors to the two adjacent groups of signal wiring lines for each data sequence with one of the plurality of the supply voltage lines interposed therebetween are adjacent to each other with the one of the plurality of the supply voltage lines interposed therebetween.

6. An electro-optical device comprising:

a display unit that has a plurality of switching elements provided at intersections of a plurality of scanning lines and a plurality of data lines and that drives the plurality of switching elements based on image signals supplied to the plurality of data lines so as to display images;

a driving unit that controls driving of the display unit through a phase expansion so as to drive the plurality of switching elements for predetermined blocks;

m×n signal wiring lines that transmit image signals, the image signals being divided into m (where m is a natural number of 2 or more) parallel data sequences and each of the data sequences including n (where n is a numerical value of 2 or higher and also a natural number of less than or equal to m) parallel image signals, and that have first extended portions such that the m×n signal wiring lines are grouped into a plurality of groups of signal wiring lines, each of the plurality of groups of signal wiring lines including n signal wiring lines for each data sequence on a substrate, and such that the plurality of groups of signal wiring lines for each data sequence are grouped;

a plurality of branch wiring lines that are branched in a direction of the plurality of data lines, from corresponding to the plurality of groups of signal wiring lines, to reach the driving unit, the plurality of branch wiring lines having second extended portions such that the plurality of branch wiring lines are grouped into a plurality of groups of branch wiring lines for each data sequence on the substrate;

a plurality of first supply voltage lines being applied a supply voltage, wherein at least one of the first supply voltage lines is formed between two adjacent groups of the plurality of groups of branch wiring lines, runs along the branch wiring lines of the two adjacent groups in the second extended portions, and is not formed between two adjacent branch wiring lines of a same group of the plurality of groups of branch wiring lines, wherein each of the first supply voltage lines are branched in a direction of the plurality of data lines, from a corresponding second supply voltage line;

at least one sampling signal line supplied with a sampling signal from the driving unit, wherein at least a portion of each sampling signal line is adjacent and between two of the plurality of the first supply voltage lines; and a plurality of mounting terminals, the signal wiring lines being disposed between the plurality of mounting terminals and the driving unit, the plurality of groups of signal wiring lines each being comprised of more than one group of signal wiring lines.

7. The electro-optical device according to claim 6, wherein the second extended portion is provided at a boundary between an image display region on which the display unit is disposed and a peripheral region disposed in the periphery of the image display region and passes through a sealing region through which an electro-optical material of the display unit is sealed.

8. The electro-optical device according to claim 6, wherein the second supply voltage line is formed between two adjacent groups of signal wiring lines for each data sequence along each signal wiring line in a portion where each signal wiring line extends, wherein a main line portion has the extended portions of the signal wiring lines and the second supply voltage lines, respectively, the branch wiring lines have relay signal wiring lines that are branched in a direction to cross the main line portion from the signal wiring lines in the main line portion and lead signal wiring lines that connect the relay signal wiring lines to the data lines, respectively, and each of the first supply voltage lines is connected to a corresponding supply voltage lead wiring line that is branched from the corresponding second supply voltage line in the main line portion.

9. The electro-optical device according to claim 8, wherein a plurality of second supply voltage lines are arranged, and the supply voltage lead wiring line is branched from one of the plurality of second supply voltage lines that is disposed at the outermost side of the main line portion.

10. The electro-optical device according to claim 8,
wherein a plurality of second supply voltage lines are arranged, and
the supply voltage lead wiring line is branched from each of the plurality of second supply voltage lines so as to correspond to the portions where the branch wiring lines extend.

11. The electro-optical device according to claim 8,
wherein the signal wiring lines, the first supply voltage line, the lead signal wiring lines, and the supply voltage lead wiring line are formed on a first layer, and
the relay signal wiring line is formed on a second layer different from the first layer.

12. The electro-optical device according to claim 8, further comprising:
a supply voltage relay wiring line that is connected to the first supply voltage lines across the main line portion and that is wired between the relay signal wiring lines.

13. The electro-optical device according to claim 12,
wherein the signal wiring lines, the first supply voltage lines, the lead signal wiring lines, and the supply voltage lead wiring line are formed on a first layer, and
the relay signal wiring lines and the supply voltage relay wiring line are formed on a second layer different from the first layer.

14. The electro-optical device according to claim 6, wherein signal wiring lines of one of the plurality of groups of signal wiring lines transmit image signals of n subpixels constituting one pixel and corresponding to n colors as n parallel image signals in each data sequence, and the first supply voltage lines are arranged adjacent to branch wiring lines of one of the plurality of groups of branch wiring lines that transmit image signals of subpixels corresponding to colors, excluding green, of the n colors.

15. The electro-optical device according to claim 6, wherein the signal wiring lines of one of the plurality of groups of signal wiring lines transmit image signals of n subpixels constituting one pixel and corresponding to n colors as n parallel image signals in each data sequence, branch wiring lines of one of the plurality of groups of branch wiring lines that transmit image signals of subpixels corresponding to green of the n colors are disposed between branch wiring lines of one of the plurality of groups of branch wiring lines that transmit image signals of subpixels corresponding to red of the n colors and branch wiring lines of one of the plurality of groups of branch wiring lines that transmit image signals of subpixels corresponding to blue of the n colors.

16. The electro-optical device according to claim 6,
wherein the signal wiring lines transmit image signals of n subpixels constituting one pixel and corresponding to n colors as n parallel image signals in each data sequence,
the plurality of branch wiring lines are formed such that the branch wiring lines that transmit the image signals of the subpixels corresponding to the same color of the n colors to the two adjacent groups of branch wiring lines for each data sequence with one of the plurality of the first supply voltage line interposed therebetween are adjacent to each other with the one of the plurality of the first supply voltage line interposed therebetween.

17. An electronic apparatus comprising the electro-optical device according to claim 1 as a display unit.

18. The electro-optical device according to claim 1, further comprising a termination portion formed by a plurality of end portions of the plurality of supply voltage lines.

19. The electro-optical device according to claim 6, further comprising a termination portion formed by a plurality of end portions of the plurality of first supply voltage lines.

20. The electro-optical device according to claim 6, wherein each branch wiring line supplies a same signal as an associated signal wiring line from which the branch wiring line extends.

* * * * *